(12) United States Patent
Li

(10) Patent No.: US 9,379,996 B2
(45) Date of Patent: Jun. 28, 2016

(54) BANDWIDTH VIRTUALIZATION

(75) Inventor: Gordon Yong Li, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 262 days.

(21) Appl. No.: 13/535,568

(22) Filed: Jun. 28, 2012

(65) Prior Publication Data

US 2014/0003449 A1    Jan. 2, 2014

(51) Int. Cl.
| | |
|---|---|
| *H04L 12/911* | (2013.01) |
| *H04L 12/917* | (2013.01) |
| *H04L 12/927* | (2013.01) |
| *H04W 4/00* | (2009.01) |

(52) U.S. Cl.
CPC ............... *H04L 47/76* (2013.01); *H04L 47/74* (2013.01); *H04L 47/803* (2013.01); *H04L 47/828* (2013.01); *H04W 4/00* (2013.01); *H04L 47/824* (2013.01)

(58) Field of Classification Search
CPC ..... H04L 47/828; H04L 47/803; H04L 47/76; H04L 47/74; H04L 12/2863
See application file for complete search history.

(56) References Cited

U.S. PATENT DOCUMENTS

| | | | | |
|---|---|---|---|---|
| 6,985,437 | B1 * | 1/2006 | Vogel | ............................ 370/230 |
| 7,322,021 | B2 | 1/2008 | Hamlin | |
| 7,460,526 | B1 | 12/2008 | Hoffman et al. | |
| 2008/0259841 | A1 | 10/2008 | Deshpande | |
| 2010/0284275 | A1 * | 11/2010 | Martinez et al. | ............... 370/231 |
| 2013/0196653 | A1 * | 8/2013 | Morrison | ................... 455/426.1 |

FOREIGN PATENT DOCUMENTS

| | | |
|---|---|---|
| CN | 102523204 A | 6/2012 |
| EP | 2 378 724 B1 | 10/2011 |
| TW | I314409 | 9/2009 |
| TW | M381969 | 6/2010 |
| TW | I350090 | 10/2011 |

OTHER PUBLICATIONS

Evensen et al, "A Network-Layer Proxy for Bandwidth Aggregation and Reduction of IP Packet Reordering" IEEE 34th Conference, 2009.*

* cited by examiner

*Primary Examiner* — Omer S Mian

(74) *Attorney, Agent, or Firm* — Brinks Gilson & Lione

(57) ABSTRACT

A method and system virtualizes bandwidth. The system may include multiple communication interfaces to communicate across a hybrid network containing multiple networks of different types, technologies, protocols, topologies, or other network characteristics. The system may aggregate the bandwidth of the multiple communication interfaces into an aggregated virtualized bandwidth. When a bandwidth request is received, the system may determine a bandwidth allocation across the aggregated virtualized bandwidth. The system may also determine a communication resource allocation for the bandwidth allocation, which may assign any number of the communication interfaces. The system may then communicate application data across the allocated bandwidth.

15 Claims, 9 Drawing Sheets

US 9,379,996 B2

BANDWIDTH VIRTUALIZATION

TECHNICAL FIELD

This disclosure relates to virtualizing bandwidth. More specifically, this disclosure relates to virtualizing bandwidth of a network device.

BACKGROUND

Rapid advances in electronics and communication technologies, driven by immense user demand, have resulted in vast interconnected networks of electronic devices capable of exchanging immense amounts of data. For example, Local Area Networks (LANs) may connect hundreds or thousands of electronic devices in a single network. Perhaps the best known example of such interconnection of such devices is the Internet, which continues to expand with each passing day. Also, electronic devices continue to grow in sophistication, capability, and complexity. As technology continues to advance and interconnected communication networks grow in size and frequency of use, there is an increasing incentive to send and receive data more efficiently.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
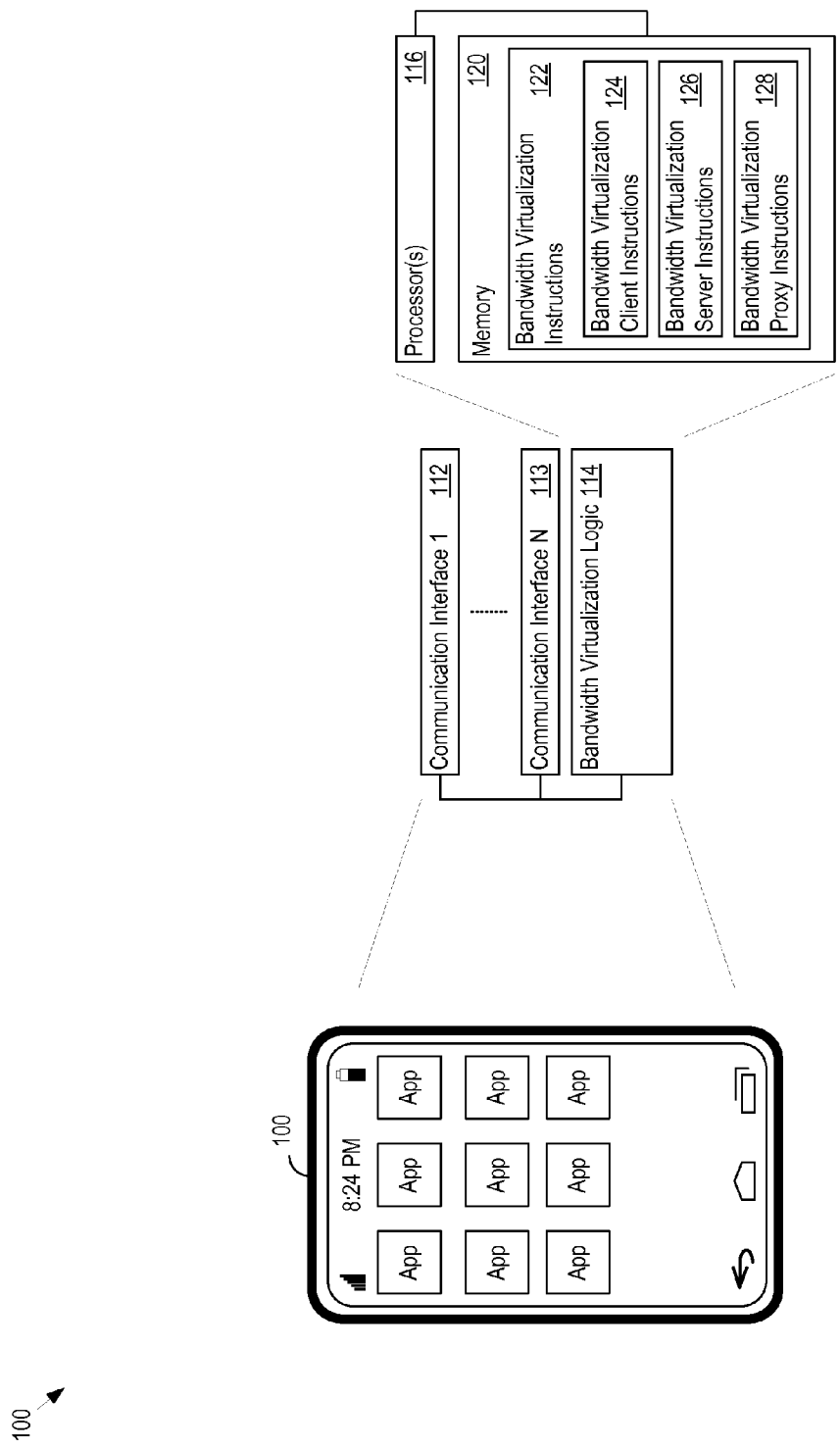
FIG. 1 shows an example of a device for virtualizing bandwidth.

FIG. 1 shows an example of a device 100 for virtualizing bandwidth. The device 100 may be any electronic device capable of communicating data. As examples, the device 100 may be a laptop, desktop, or other type of computer, a mobile phone, a personal data assistance, a portable e-mail device, or portable MP3 player. Additional examples include a set top box, a television, a stereo, a tablet device, high definition (e.g., Blu-Ray™ or DVD audio) media players, a home media server, any type of communication modem (e.g., digital subscriber line (DSL) or cable), a network router, a network hub, a bridge, a switch, any type of gateway device, a server, or other electronic devices. The device 100 may also be any type of network device used by a service provider to operate a communication network, including any of the devices listed above.

The device 100 may include any number communication interfaces. In FIG. 1, the device 100 contains N number of communication interfaces, two of which are labeled communication interface 1 112 and communication interface N 113. A communication interface may be configured to communicate across any number of communication networks, including communication networks that support various properties, e.g., quality-of-service (QoS), network technologies, network standards, network topologies, encoding formats, physical (PHY) interfaces, and more. For example, a communication interface may communicate according to any of the following network technologies, topologies, mediums, or and standards: Ethernet, cable (e.g. DOCSIS), DSL, Multimedia over Coax Alliance (MoCA), power line (e.g. Home-Plug AV), Ethernet Passive Optical Network (EPON), Gigabit Passive Optical Network (GPON), any number of cellular standards (e.g., 2G, 3G, Universal Mobile Telecommunications System (UMTS), GSM (R) Association, Long Term Evolution (LTE) (TM), or more), WiFi (including 802.11 a/b/g/n/ac), WiMAX, Bluetooth, WiGig, and others. A communication network, for the purposes of bandwidth virtualization, may refer to characteristics such as (as examples), a physical interface (e.g., a wired or wireless USB port or Ethernet port), a protocol or standard that governs how data is sent or received on the physical interface (e.g., 802.11n), an identified set of one or more endpoints connected to a particular physical interface or operating in accordance with a particular protocol or standard, or an identified set of intermediary devices including as examples bridges, switches, routers, repeaters, or other network devices, or any combination of such characteristics. The device 100 may communicate across any number of networks using the communication interfaces 1-N.

The device 100 may also include bandwidth virtualization logic 114. In one implementation, the bandwidth virtualization logic 114 includes one or more processors 116 and a memory storing bandwidth virtualization instructions 122. The bandwidth instructions 112 may include any combination of bandwidth virtualization client instructions 124, bandwidth virtualization server instructions 126, and bandwidth virtualization proxy instructions 128. As described in greater detail below, the bandwidth virtualization logic 114 may aggregate the bandwidth of any number of communication interfaces for any number of communication networks in the device 100 into an aggregated virtualized bandwidth. The aggregated virtualized bandwidth may include an upstream bandwidth and a downstream bandwidth. When the bandwidth virtualization logic 114 receives a bandwidth request, e.g., from an application running on the device 100, the bandwidth virtualization logic 114 may determine a bandwidth allocation across the aggregated virtualized bandwidth. The virtualization logic 114 may then communicate application data through the bandwidth allocation.

Figure 2:
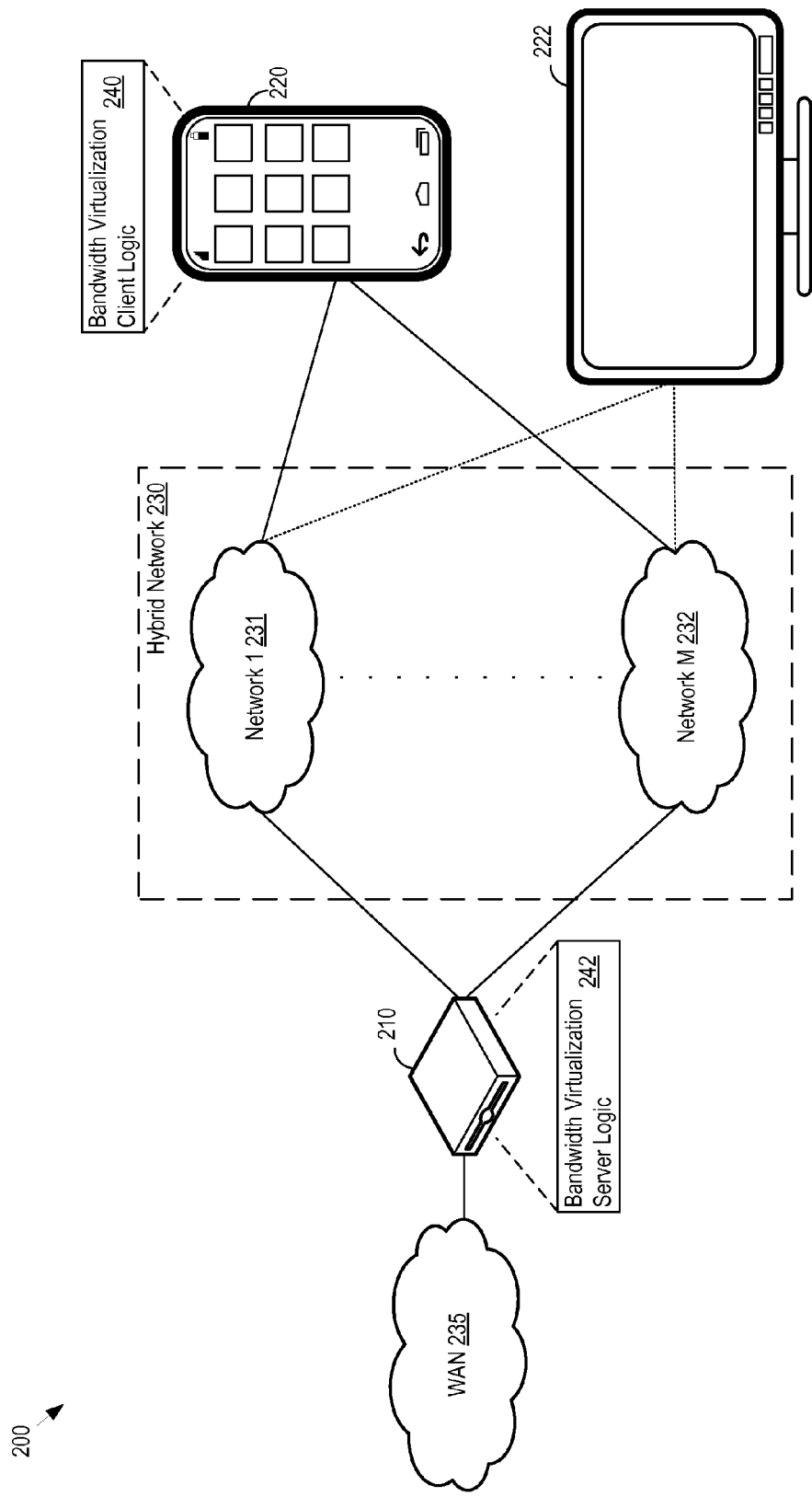
FIG. 2 shows an exemplary system for virtualizing bandwidth.

FIG. 2 shows an exemplary system 200 for virtualizing bandwidth. The system 200 includes a gateway device 210. A gateway device or gateway functionality may refer to any device that communicates data with multiple devices. A gateway device, such as the gateway device 210, may also refer to any device that routes data to multiple destinations, e.g. devices. The gateway device 210 may communicate with any number of client devices. In the exemplary system 200 shown in FIG. 2, the gateway device 210 is communicatively coupled to the client device 220 (e.g., a tablet device) and the client device 222 (e.g., a high definition television) through the hybrid network 230. As one example, the gateway device 210 is connected to the wide area network (WAN) 235 and may provide Internet access for client devices connected to the gateway device 210.

The hybrid network 230 may include multiple communication networks operating according to various network technologies, standards, topologies, encoding formats, and more (e.g., any of the networks discussed above). The hybrid network 230 depicted in FIG. 2 includes M number of communication networks, including the communication networks labeled network 1 231 and network M 232. As one example, the hybrid network 230 may include any number of local area networks (LAN) and the gateway device 210 may be a cable modem providing Internet access to the LANs. Network 1 231 may be a 802.11g wireless network and network M 232 may be a wired Ethernet network. As seen in FIG. 2, the gateway device 210 may communicate with the client device 220 through network 1 231 and network M 232. The gateway device 210 may also communicate with the client device 222 through network 1 231 and network M 232 as well. The gateway device 210 may further communicate with the client device 220 or the client device 222 through any other communication network in the hybrid network 230.

In operation, the client device 220 may communicate across network 1 231 through a first communication interface and across network M 232 through a second communication interface. The client device 220 may act as a bandwidth virtualization client. A bandwidth virtualization client may be any device that initiates the bandwidth virtualization process. The gateway device 210 may act as a bandwidth virtualization server. A bandwidth virtualization server may be any device that coordinates with a bandwidth virtualization client, e.g., the client device 220, during the bandwidth virtualization process.

A bandwidth virtualization client, e.g., the client device 220, may contain bandwidth virtualization logic 114 that includes the bandwidth virtualization client logic 240. In one implementation, the bandwidth virtualization client logic 240 is implemented, at least in part, through the bandwidth virtualization client instructions 124. The bandwidth virtualization client logic 240 may aggregate the bandwidth of any number of communication interfaces of the client device 220. For example, the bandwidth virtualization client logic 240 may aggregate some or all of the bandwidth of the first communication interface (that communicates across network 1 231) and some or all of the second communication interface (that communications across network 2 232) to obtain a total amount of bandwidth available for communications (e.g., by applications on the client device 220). This total bandwidth may be considered the aggregated virtualized bandwidth available for allocation.

The bandwidth virtualization client logic 240 may receive a bandwidth request, for example from an application executing on the client device 220. The bandwidth request may specify a requested bandwidth amount, which may include a requested upstream amount, a requested downstream amount, or both. The bandwidth virtualization client logic 240 may then determine a bandwidth allocation for the application across the aggregated virtualized bandwidth. The bandwidth virtualization client logic 240 may determine the bandwidth allocation based on the bandwidth request, the available bandwidth in the aggregated virtualized bandwidth, network characteristics (e.g. line rate or throughput), application preferences, device preferences, user preferences, or any combination of such factors.

The bandwidth virtualization client may communicate with a bandwidth virtualization server to negotiate the bandwidth allocation. The bandwidth virtualization client logic 240 may create a bandwidth allocation description of the bandwidth allocation. The bandwidth allocation description may include information characterizing the bandwidth allocation. For example, the bandwidth allocation description may include an upstream bandwidth allocation, a downstream bandwidth allocation, or other properties of the bandwidth allocation determined by the bandwidth virtualization client logic 240. The bandwidth virtualization client logic 240 may send the bandwidth allocation description to a bandwidth virtualization server, e.g., the gateway device 210.

The bandwidth virtualization server logic 242 of the gateway device 210 may determine if the gateway device 210 (acting as a bandwidth virtualization server) will accept the bandwidth allocation described in the bandwidth allocation description from the client device 220. For example, the bandwidth virtualization server logic 242 may determine if the gateway device 210 has available bandwidth to service the bandwidth allocation. The bandwidth virtualization server logic 242 may check availability of bandwidth by determining use of aggregated virtualized bandwidth on the gateway device 210.

If the bandwidth virtualization server logic 242 accepts the bandwidth allocation from the client device 220, the bandwidth virtualization server logic 242 may send a confirmation indication informing the bandwidth virtualization client logic 240 that the bandwidth allocation was accepted. If the bandwidth virtualization server logic 242 rejects the bandwidth allocation from the client device 220, the bandwidth virtualization server logic 242 may send a rejection indication informing the bandwidth virtualization client logic 240 that the bandwidth allocation was rejected. The bandwidth virtualization server logic 242 may also send an alternative bandwidth allocation description to the bandwidth virtualization client logic 240, which may describe a bandwidth allocation the bandwidth virtualization server can accept.

The bandwidth virtualization client logic 240 and the bandwidth virtualization server logic 242 may negotiate a final bandwidth allocation that may identify an upstream bandwidth allocation and a downstream bandwidth allocation that the client and server both accept. The negotiation may, for example, take the form of a sequence of request messages, each specifying a proposed or modified bandwidth allocation, and an acceptance or rejection message for any particular proposal. The bandwidth virtualization client logic 240 may allocate the final bandwidth allocation to the application and communicate application data through the final bandwidth allocation.

The bandwidth virtualization server logic 242 may allocate a portion (or "slice") across the aggregated virtualized bandwidth of the gateway device 210 for communicating application data from the client device 220. The bandwidth virtualization server logic 242 may also negotiate bandwidth allocations with other client devices connected to the gateway device 210, such as the client device 222.

Figure 3:
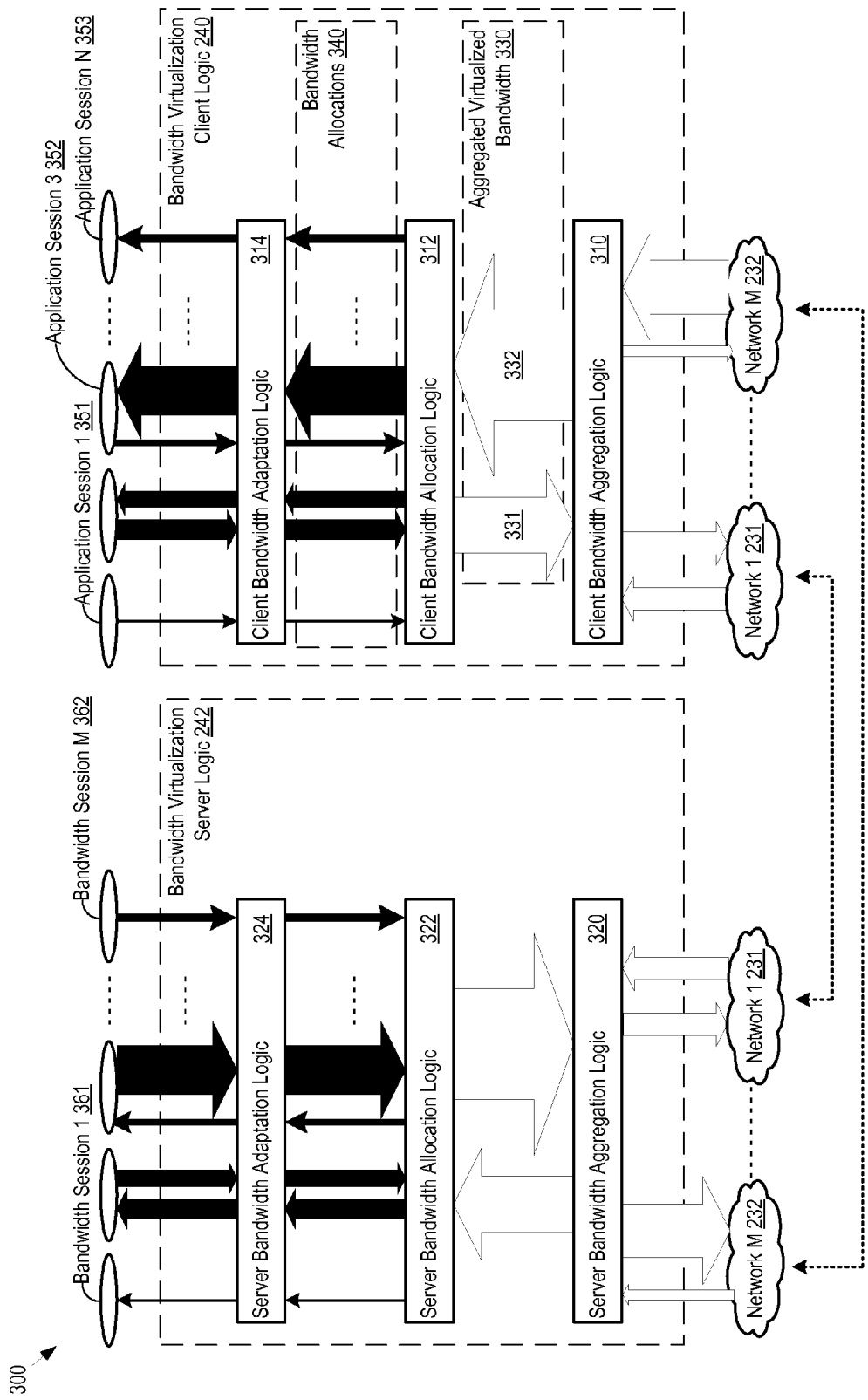
FIG. 3 shows an example of a system for bandwidth virtualization.

FIG. 3 shows an example of a system 300 for bandwidth virtualization. The system 300 includes bandwidth virtualization logic 240 that may be implemented on a bandwidth virtualization client device. The bandwidth virtualization client logic 240 may include client bandwidth aggregation logic 310, client bandwidth allocation logic 312, and client bandwidth adaptation logic 314, as seen in FIG. 3. The system 300 also includes bandwidth virtualization server logic 242, for example as implemented on a bandwidth virtualization server. The bandwidth virtualization server logic 242 may include server bandwidth aggregation logic 320, server bandwidth allocation logic 322, and server bandwidth adaptation logic 324.

A device implementing the bandwidth virtualization client logic 240 may be connected to any number of networks, for example through the hybrid network 230. In FIG. 3, the bandwidth virtualization client logic 240 may configure communication of the device across multiple communication networks including network 1 231 and network M 232. For example, the bandwidth virtualization client logic 240 may configure device communication with a bandwidth virtualization server device implementing the bandwidth virtualization server logic 242 any number of networks, such as network 1 231 and network M 232.

In operation, the client bandwidth aggregation logic 310 may aggregate the bandwidth of communication interfaces in various ways. For example, the client bandwidth aggregation logic 310 may sum some or all of the bandwidth from the communication interfaces. In one implementation, a communication interface may include a software driver. The client bandwidth aggregation logic 310 may query communication interface drivers to obtain a bandwidth description of a respective communication interface. The bandwidth description may specify the available or the total upstream and downstream bandwidth of the communication interface.

Upon obtaining bandwidth descriptions of communication interfaces in a device, the client bandwidth aggregation client 310 may sum the bandwidths of the communication interfaces to obtain an aggregated virtualized bandwidth 330. In FIG. 3, the client bandwidth aggregation logic 310 determines the aggregated virtualized bandwidth 330, which may include an aggregated upstream band 331 and an aggregated downstream band 332. The aggregated virtualized bandwidth 330 may be implemented in any number of ways. As one example, the client bandwidth aggregation client 310 may store the aggregated virtualized bandwidth 330 as register values in a memory. Stored values of the aggregated virtualized bandwidth 330 may include any combination of a total upstream bandwidth value, a total downstream bandwidth value, a total aggregated bandwidth value, an available downstream bandwidth value, an available upstream bandwidth value, and an available bandwidth value. The server bandwidth aggregation logic 320 may aggregate bandwidth of communication interfaces of a bandwidth virtualization server to obtain an aggregated virtualized bandwidth of the server device in a similar way.

The client bandwidth allocation logic 312 may determine any number of bandwidth allocations 340 across the aggregated virtualized bandwidth 330. The client bandwidth allocation logic 312 may determine a bandwidth allocation based on bandwidth requests received by the client bandwidth adaptation logic 314. The client bandwidth allocation logic 312 may "slice" the bandwidth allocation as a portion of the aggregated virtualized bandwidth 330 to allocate according to the bandwidth request. The client bandwidth allocation logic 312 may implement a bandwidth allocation in any number of ways, for example as register values, as entries in a bandwidth allocation table, or as values stored in a memory. A bandwidth allocation may include any combination of an upstream bandwidth allocation value, a downstream bandwidth allocation value, and a total bandwidth allocation value.

The bandwidth allocation may also include a communication resource identification. In one implementation, the communication resource identification may identify any communication resources, e.g., communication interfaces, assigned to the bandwidth allocation as well as an amount of bandwidth allocated to each communication resource. The client bandwidth allocation logic 312 may receive the communication resource identification determined by the client bandwidth aggregation logic 310, for example, after a final bandwidth allocation is negotiated with a bandwidth virtualization server. As one example, the communication resource indication may include 1 Mbps Ethernet bandwidth through a first communication resource (e.g., Ethernet port) and 256 Kbps WiFi through a second communication resource (e.g., WiFi radio).

The client bandwidth adaptation logic 314 may receive bandwidth requests from various sources. In one implementation, the client bandwidth adaptation logic 314 may interface the bandwidth virtualization client logic 240 between any number of applications or processes of a device requesting communication bandwidth. As seen in FIG. 3, the client bandwidth adaptation logic 314 may receive bandwidth requests from multiple application sessions, such as application session 1 351, application session 3 352 and application session N 353. Bandwidth requests from application sessions may include an upstream bandwidth request, e.g., application session 1 351, a downstream bandwidth request, e.g., application session N 353, or both, e.g., application session 3 352. An application may send multiple bandwidth requests which the client bandwidth adaptation logic 314 may handle as multiple application sessions.

After determining a bandwidth allocation for an application bandwidth request, the bandwidth virtualization client logic 240 may create a bandwidth allocation description to send to the bandwidth virtualization server logic 242. In one implementation, the bandwidth virtualization client logic 240 may send the bandwidth allocation description using an existing datapath, such as across network 1 231 or network M 232. The bandwidth virtualization client logic 240 and the bandwidth virtualization server logic 242 may negotiate a final bandwidth allocation to communicate application data across.

Once a final bandwidth allocation has been negotiated, the server bandwidth allocation logic 322 may allocate a bandwidth slice in the server aggregated virtualized bandwidth based on the final bandwidth allocation. The bandwidth allocations on the server side may be associated with any number of bandwidth sessions, such as bandwidth session 1 361 and bandwidth session M 362.

The bandwidth virtualization client logic 240 may receive a bandwidth release indication from an application. The bandwidth release indication may indicate the application no longer requires bandwidth allocated to the application via a previous bandwidth request. In response, the bandwidth virtualization client logic 240 may deallocate the bandwidth allocation determined based on the previous bandwidth request. The bandwidth virtualization client logic 240 may also send a deallocation indication to the bandwidth virtualization server logic 242 indicating the release of the bandwidth allocation. The bandwidth virtualization client logic 240 may consider the deallocated bandwidth when determining a bandwidth allocation for a subsequent bandwidth request.

Figure 4:
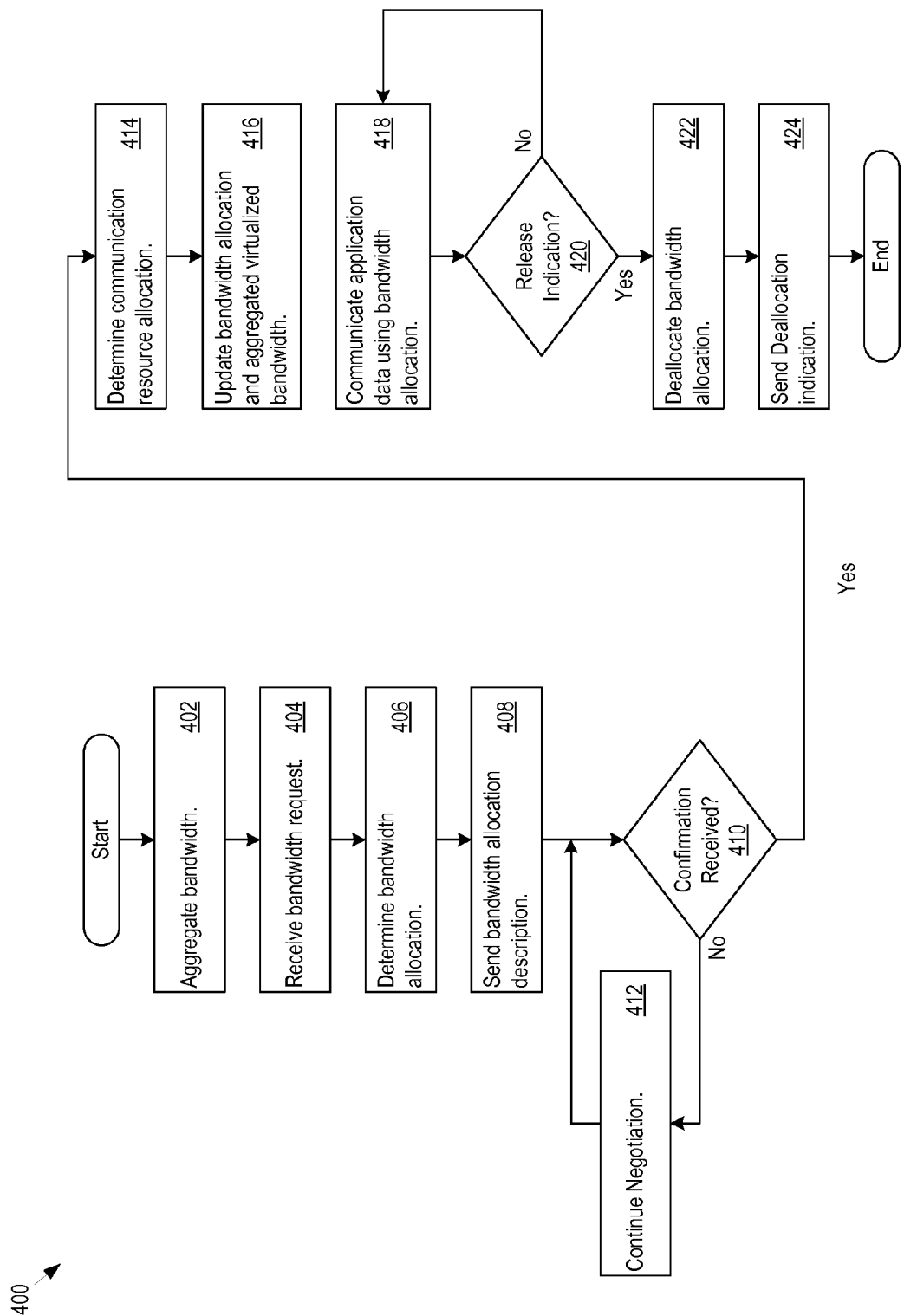
FIG. 4 shows an example of logic that a device may implement as hardware, software, or both.

FIG. 4 shows an example of logic 400 that the device 100 may implement in hardware, software, or both. For example, the device 100 may implement the logic 400 as the bandwidth virtualization logic 114 or the bandwidth virtualization client logic 240. The bandwidth virtualization client logic 240 may aggregate the bandwidth of communication resources, e.g., communication interfaces, in the device 100 into an aggregated virtualized bandwidth (402). The aggregated virtualized bandwidth may include a total bandwidth of the communication interfaces and available bandwidth of the communication interfaces. The bandwidth virtualization client logic 240 may receive a bandwidth request (404) and determine a bandwidth allocation based on the bandwidth request (406). In one implementation, when determining the bandwidth allocation, the bandwidth virtualization client logic 240 may access the aggregated virtualized bandwidth to obtain an available bandwidth indication. The bandwidth virtualization client logic 240 may then send a bandwidth allocation description to a bandwidth virtualization server (408), such as a gateway device in communication with the device 100.

The bandwidth virtualization client logic 240 may receive a response from the bandwidth virtualization server (410). If the bandwidth virtualization server rejects the bandwidth allocation described in the bandwidth allocation description, the bandwidth virtualization client logic 240 may continue negotiation with the bandwidth server logic to determine a final bandwidth allocation (412). If the bandwidth virtualization client logic 240 receives a confirmation message from the bandwidth virtualization server accepting the bandwidth allocation (which may then be referred to as a final bandwidth allocation), the bandwidth virtualization client logic 240 may determine a communication resource allocation for the bandwidth allocation (414).

The bandwidth virtualization client logic 240 may allocate communication resources to a bandwidth allocation in any number of ways or according to any number of criteria. For example, the bandwidth virtualization client logic 240 may consider the available bandwidth of communication resources when determining a communication resource allocation for the bandwidth allocation. In one implementation, a bandwidth request may include quality-of-service (QoS) requirements, which the bandwidth virtualization client logic 240 may consider when allocating communication resources to the bandwidth allocation. The bandwidth virtualization client logic 240 may also determine a communication resource allocation such that the bandwidth allocation is serviced by a single communication resource, e.g., communication interfaces. The bandwidth virtualization client logic 240 may also determine a communication resource allocation such that the bandwidth allocation is serviced by multiple communication resources. In another example, the bandwidth virtualization client logic 240 may determine communication resource allocations by alternating allocations among different communication resources.

The bandwidth virtualization client logic 240 may update the bandwidth allocation to include a communication resource identification as well as update the availability information of the aggregated virtualized bandwidth to reflect the allocation of a bandwidth slice to the bandwidth allocation (416). Then, the bandwidth virtualization client logic 240 may communicate application data across the bandwidth allocation (418) until a release indication is received (420), e.g., from the application that previously sent the bandwidth request. After receiving a release indication, the bandwidth virtualization client logic 240 may deallocate the bandwidth allocation (422), e.g., by updating availability information of the aggregated virtualized bandwidth. The deallocated bandwidth may be considered by the bandwidth virtualization client logic 240 during subsequent bandwidth allocation determinations. The bandwidth virtualization client logic 240 may then send a deallocation indication to the bandwidth virtualization server (424).

Figure 5:
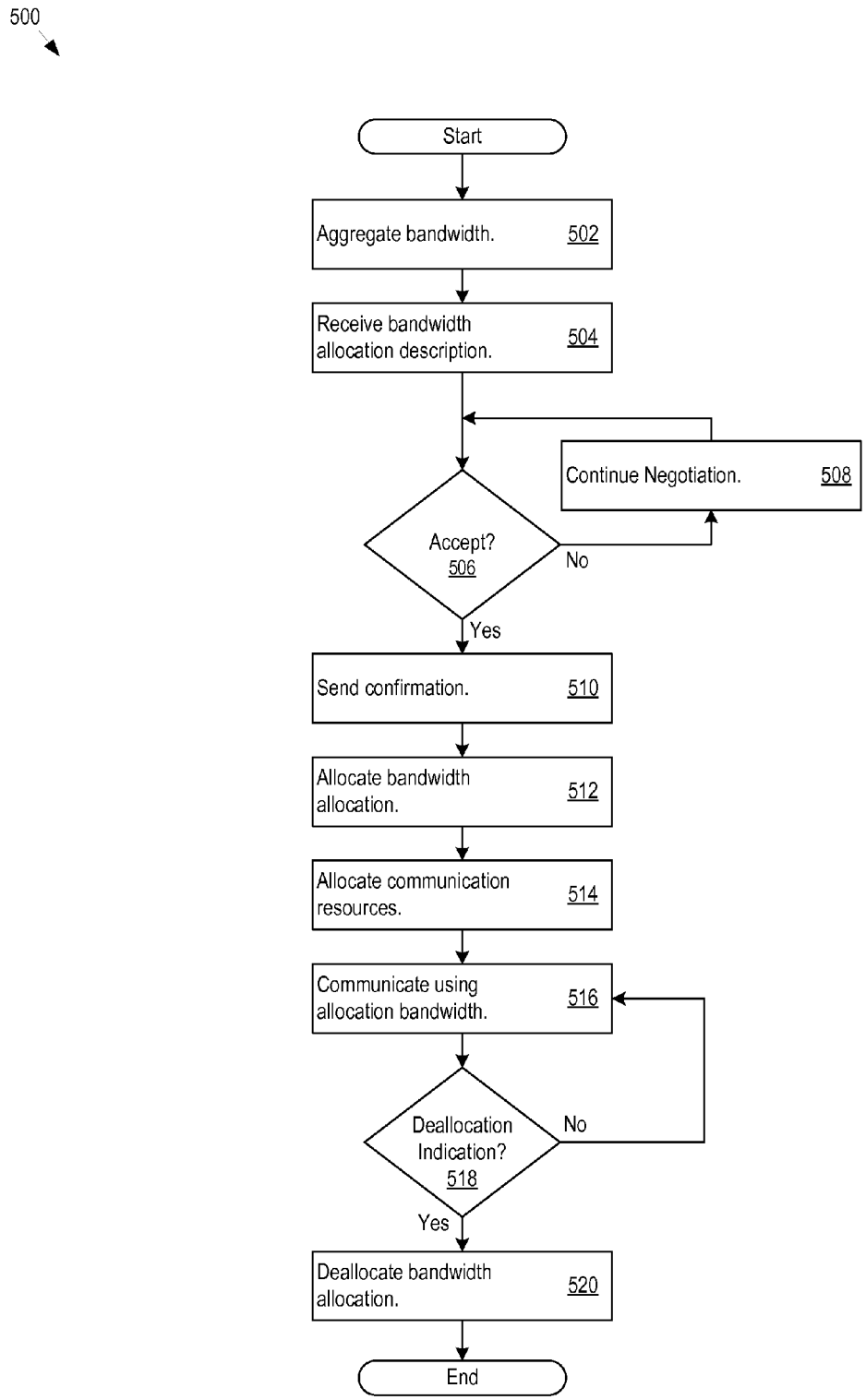
FIG. 5 shows an example of logic that a device may implement as hardware, software, or both.

FIG. 5 shows an example of logic 500 that the device 100 may implement in hardware, software, or both. For example, the device 100 may implement the logic 500 as the bandwidth virtualization logic 114 or the bandwidth virtualization server logic 242. The bandwidth virtualization server logic 242 may aggregate the bandwidth of communication resources, e.g., communication interfaces, in the device 100 into an aggregated virtualized bandwidth (502). The bandwidth virtualization server logic 242 may receive a bandwidth allocation description (504) from a client device, e.g., the client devices 220-222. The bandwidth virtualization server logic 242 may determine whether the bandwidth allocation described in the bandwidth allocation description is acceptable (506), for example, by determining if the bandwidth virtualization server has available bandwidth to allocate according to the bandwidth allocation description. If the bandwidth virtualization server logic 242 rejects the bandwidth allocation description, the bandwidth virtualization server logic 242 may continue negotiating with the client device to determine an acceptable final bandwidth allocation (508).

If the bandwidth virtualization server logic 242 accepts the bandwidth allocation description, the bandwidth virtualization server logic 242 may send a confirmation to the client device (510). The bandwidth virtualization server logic 242 may then allocate the bandwidth allocation specified in the bandwidth allocation description or the negotiated final bandwidth allocation (512). For example, the bandwidth virtualization server logic 242 may create a bandwidth session for the bandwidth allocation and update the aggregated virtualized bandwidth to reflect the bandwidth slice allocated to the bandwidth allocation. The bandwidth virtualization server logic 242 may also allocate communication resources, e.g., communication interfaces, to the bandwidth allocation (514). The bandwidth virtualization server logic 242 may then communicate with the client device through the bandwidth allocation (516).

The bandwidth virtualization server logic 242 may continue to communicate data through the bandwidth allocation until a deallocation indication is received from the client device (518). The bandwidth virtualization server logic 242 may then deallocate the bandwidth allocation, such as by updating the aggregated virtualized bandwidth to reflect availability of the deallocated bandwidth. The deallocated bandwidth may be available when considering a subsequently received bandwidth allocation description.

Figure 6:
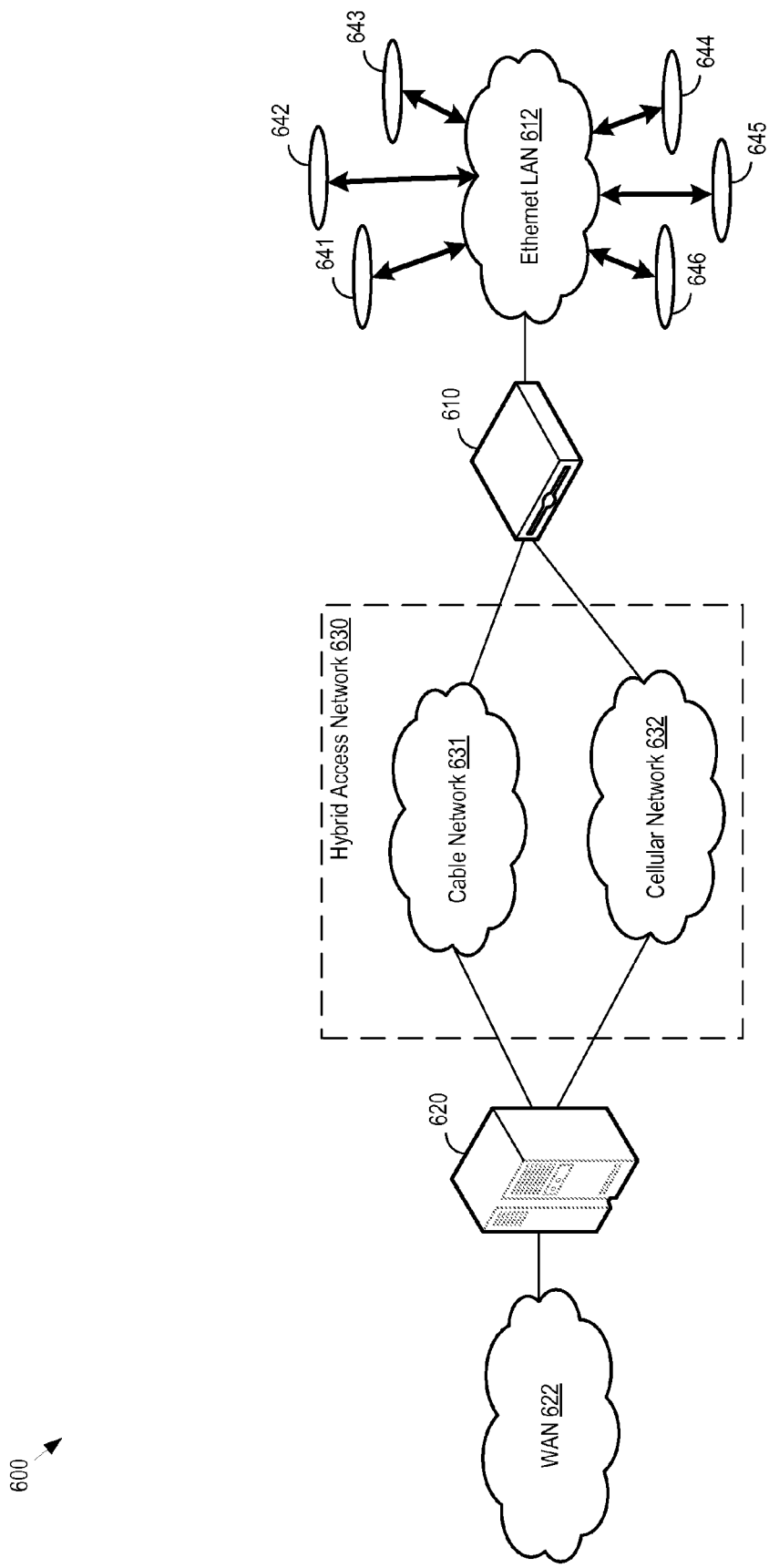
FIG. 6 shows another exemplary system for bandwidth virtualization.

FIG. 6 shows another exemplary system 600 for bandwidth virtualization. The exemplary system 600 includes a gateway device 610 that may provide Internet access to multiple devices in an Ethernet local area network (LAN) 612. In FIG. 6, the gateway device 610 acts as a bandwidth virtualization client, e.g., by implementing the bandwidth virtualization client logic 240. The system 600 also includes a server 620 that may be part of a core network of a service provider. The server 620 may be connected to a wide area network (WAN) 622, such as the Internet. The server 620 acts as a bandwidth virtualization server, e.g., by implementing the bandwidth virtualization server logic 242. The gateway device 610 and the server 620 communicate through the hybrid access network 630, which includes a cable network 631 and a cellular network 632. In other words, the gateway device 610 may communicate data to and from the server 620 through the cable network 631, through the cellular network 632, or both.

The gateway device 610 may include a first communication interface to communicate across the cable network 631 and a second communication interface to communicate across the cellular network 632. The gateway device 610 may communicate across cable network 631 at a downstream speed of 10 Megabits per second (Mbps) and an upstream speed of 0.5 Mbps. The gateway device 610 may communication across the cellular network at a downstream speed of 5 Mbps and an upstream speed of 1 Mbps.

The gateway device 210 may aggregate the bandwidth of the first communication interface and the bandwidth of the second communication interface into an aggregated virtualized bandwidth. The aggregated virtualized bandwidth may have a total aggregated bandwidth value of 16.5 Mbps, which may include a total downstream bandwidth value of 15 Mbps and a total upstream bandwidth value of 1.5 Mbps. The gateway device 610 may receive bandwidth requests from devices communicatively connected to the gateway device 610. For example, the gateway device may receive bandwidth requests from VoIP call 641-646 that may originate from any number of devices connected to the gateway device 610 through the Ethernet LAN 612. Each VoIP call 641-646 may send a bandwidth request that includes a 64 Kbps requested downstream amount and a 64 Kbps upstream amount.

The bandwidth virtualization client logic 240 implemented on the gateway device may determine a bandwidth allocation for each of the bandwidth requests sent from the VoIP calls 641-646. In one example, the bandwidth virtualization client logic 240 may slice a bandwidth allocation including 64 Kbps upstream band and a 64 kbps downstream band from the aggregated virtualized bandwidth for each of the bandwidth requests associated with VoIP calls 641-646.

Upon receiving confirmation from the server 620 that the bandwidth allocations are accepted, the bandwidth virtualization client logic 240 may determine a communication resource allocation for each of the bandwidth allocations. The bandwidth virtualization client logic 240 may allocate the first communication interface for the cable network 631 to the bandwidth allocations for VoIP calls 641-643 and the second communication interface for the cellular network 632 to the bandwidth allocations for VoIP calls 644-646. Alternatively, the bandwidth virtualization client logic 240 may allocate 16 Kbps of upstream and downstream bandwidth of the first communication interface for each of the bandwidth allocations for the VoIP calls 641-646 and 48 Kpbs of upstream and downstream bandwidth of the second communication interface for each of the bandwidth allocations. Any number of alternative communication resource allocations are possible.

Upon a communication resource allocation for a bandwidth request, the bandwidth virtualization client logic 240 may update the aggregated virtual bandwidth of the gateway device 210 accordingly. The bandwidth virtualization client logic 240 may also update any data stored regarding the availability of each communication interface based on the determined communication resource allocation accordingly as well. The gateway device 210, and specifically through the bandwidth virtualization client logic 242, may communicate data for a VoIP call 641-646 through the respective bandwidth allocation until a release indication is received, e.g., a VoIP call 641-646 concluded signaling a connection termination.

Figure 7:
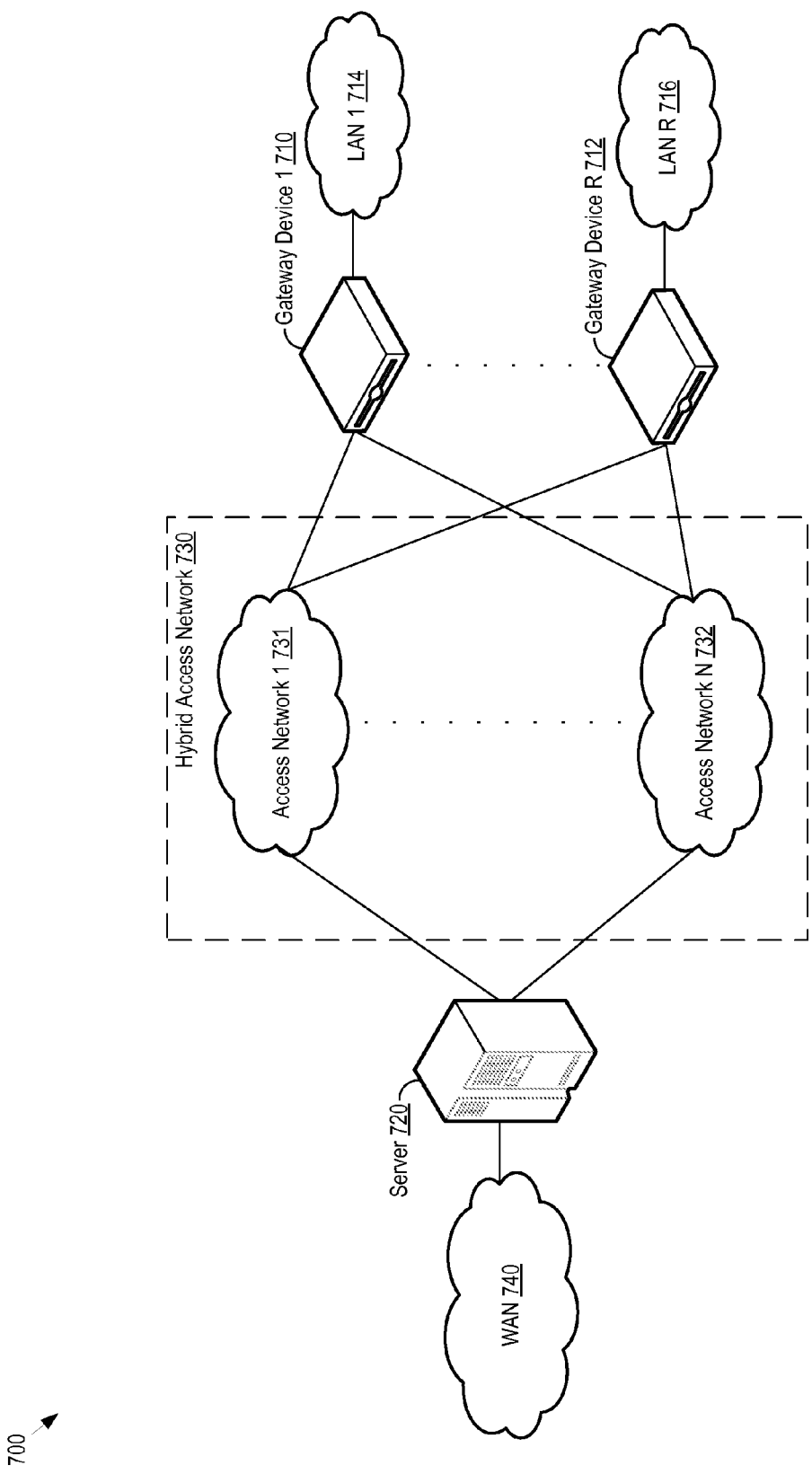
FIG. 7 shows an example of a system for bandwidth virtualization

FIG. 7 shows an example of a system 700 for bandwidth virtualization. The system 700 includes multiple gateway devices, two of which are labeled gateway device 1 710 and gateway device R 712. A gateway device may be connected to an associated LAN, which may be implemented in any number of ways. In FIG. 7, gateway device 1 is connected LAN 1 714, which may be a wired LAN, a wireless LAN, or both (e.g., a hybrid network). The gateway device R 712 is connected to LAN R 716. As examples, the gateway devices 1-R may be gateway devices located in personal residences, businesses, office buildings, wireless access points, restaurants, cafes, military bases, or any combination thereof. Each of the gateway devices 1-R may implement the bandwidth virtualization client logic 240 discussed above.

The gateway devices 1-R may be communicatively coupled to a server 720 through the hybrid access network 730. The server 720 may be part of core network of a service provider and may be used to provide access to the WAN 740, e.g., the Internet. The hybrid access network 730 may include multiple access networks, two of which are labeled access network 1 731 and access network N 732. The access networks 1-N may be any type of communication network, such as various types of broadband networks. The gateway devices 1-R and the server 720 may include multiple communication interfaces to communicate any combination of the access networks 1-N in the hybrid access network 730. The server 720 may implement the bandwidth virtualization server logic 242 discussed above. In operation, each of the gateway devices 1-R may act as a bandwidth virtualization client and initiate a bandwidth virtualization process with the server 720.

Figure 8:
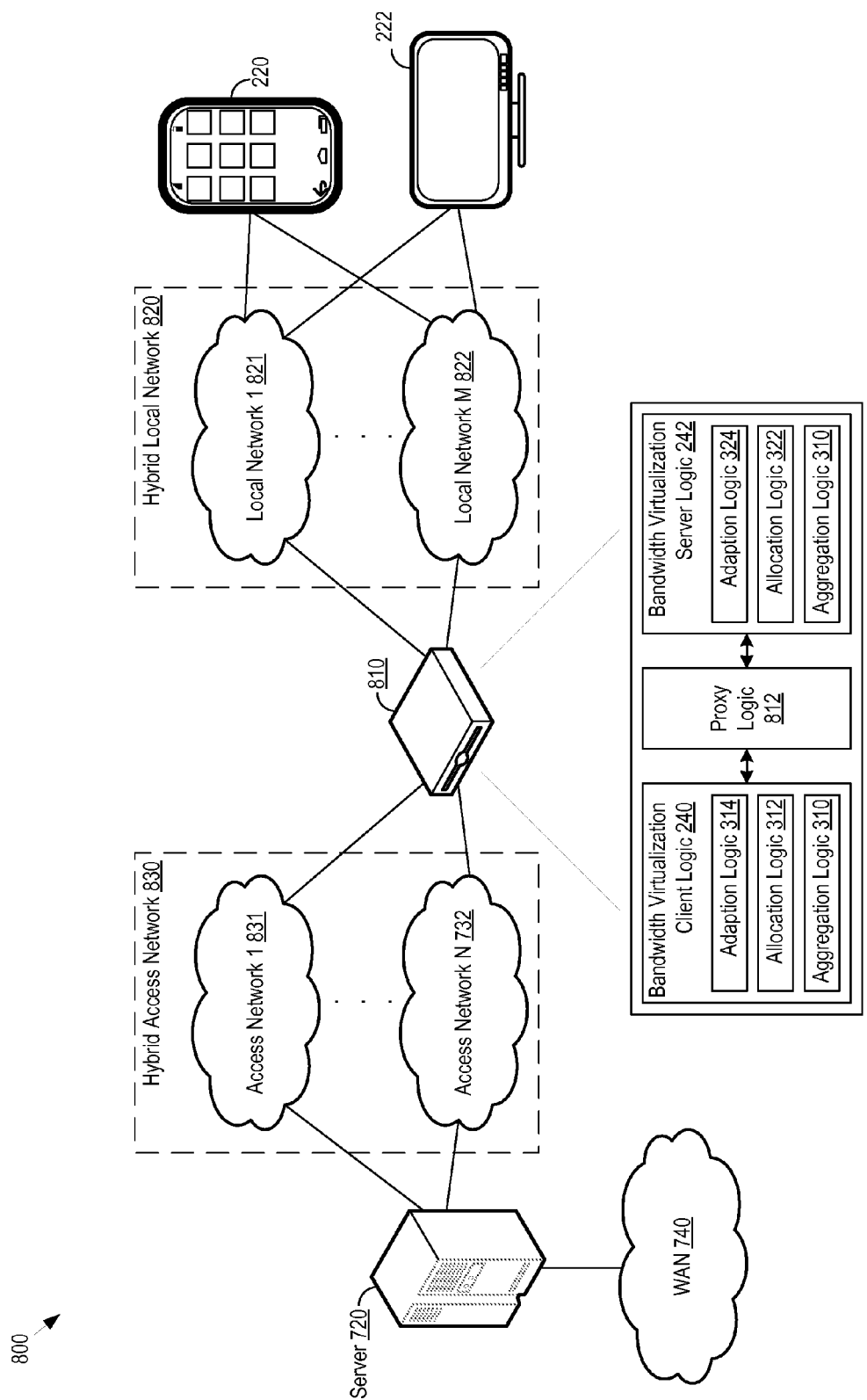
FIG. 8 shows another exemplary system for bandwidth virtualization.

FIG. 8 shows another exemplary system 800 for bandwidth virtualization. The system 800 includes a gateway device 810. The gateway device may be connected to multiple client devices in a LAN through the hybrid local network 820. In FIG. 8, the gateway device 810 is connected to the client device 220 and the client device 222 through the hybrid local network 820. The hybrid local network 820 shown in FIG. 8 includes M number of networks, two of which are labeled local network 1 821 and local network M 822. In one example, the gateway device 810 provides Internet access to client devices connected to the hybrid local network 820.

The system 800 also includes the server 720 which is connected to the WAN 740. The server 720 may provide Internet access to multiple devices through connection to the WAN 732, including the gateway device 810 shown in FIG. 8. The gateway device 810 may communicate with the server 720 through the hybrid access network 830. The hybrid access network 830 shown in FIG. 8 includes N number of networks, two of which are labeled access network 1 831 and access network N 832.

The gateway device 810 may include multiple communication interfaces to communicate across access networks 1-N of the hybrid access network 830 and networks 1-M of the hybrid local network 820. In one implementation, the gateway device 810 may include M+N number of communication interfaces.

In FIG. 8, the gateway device 810 includes bandwidth virtualization client logic 240 and bandwidth virtualization server logic 242. The gateway device 810 also includes bandwidth virtualization proxy logic 812 that may interface between the bandwidth virtualization server logic 242 and the bandwidth virtualization client logic 240. In operation, the gateway device 810 may act as both a bandwidth virtualization server and a bandwidth virtualization client. The bandwidth virtualization server logic 242 may aggregate the bandwidth of communication interfaces in the gateway device 810 for communicating with client devices across the hybrid local network 820. The bandwidth virtualization client logic 240 may aggregate the bandwidth of communication interfaces in the gateway device 810 for communicating with the server 720 across the hybrid access network 820.

In one example, the bandwidth virtualization server logic 242 may receive a bandwidth allocation description from the client device 222 connected to the hybrid local network 820. The bandwidth virtualization server logic 242 may determine if the aggregated virtualized bandwidth for communicating across the hybrid local network 820 includes available bandwidth to service the bandwidth allocation description. If not, the bandwidth virtualization server logic 242 may negotiate an accepted bandwidth allocation acceptable to both the client device 222 and the bandwidth virtualization server logic 242 of the gateway device 810.

The bandwidth virtualization server logic 242 may send a bandwidth allocation description to the bandwidth virtualization proxy logic 812. The bandwidth allocation description may describe the accepted bandwidth allocation, including an upstream bandwidth amount and a downstream bandwidth amount. The bandwidth virtualization proxy logic 812 may then send a bandwidth request to the bandwidth virtualization client logic 240 of the gateway device 810 based on the accepted bandwidth allocation described in the received bandwidth allocation description. The bandwidth virtualization client logic 240 may negotiate a final bandwidth allocation with the server 240, and the bandwidth virtualization client logic 720 may send a bandwidth allocation description of the final bandwidth allocation to the bandwidth proxy logic 812.

In one implementation, the bandwidth proxy logic 812 may synchronize the final bandwidth allocation between the bandwidth virtualization client logic 240 and the server 720 with the accepted bandwidth allocation between the bandwidth virtualization server logic 242 and the client device 222. If the final bandwidth allocation negotiated between the bandwidth virtualization client logic 240 and the server 720 is the same as the accepted bandwidth allocation, the bandwidth proxy logic 812 may confirm the accepted bandwidth allocation with the bandwidth virtualization server logic 242. If different, the bandwidth virtualization server logic 242 may negotiate with the client 222 to determine if the final bandwidth allocation between the bandwidth virtualization client logic 240 and the server 720 is an acceptable bandwidth allocation between the bandwidth virtualization server logic 242 and the client 222.

Once bandwidth allocations are finalized, the bandwidth virtualization server logic 242 may determine a communication resource allocation based on the bandwidth allocation between the bandwidth virtualization server logic 242 and the client device 222 for communicating across the hybrid local network 820, e.g., the updated accepted bandwidth allocation. The bandwidth virtualization client logic 240 may determine a communication resource allocation based on the final bandwidth allocation between the bandwidth virtualization client logic 242 and the server 720. Then, the client device 220 may communicate with the server 720, e.g., for Internet access, across the bandwidth allocations determined by the bandwidth virtualization server logic 242 and the bandwidth virtualization client logic 240 of the gateway device 810.

In one implementation, the bandwidth virtualization client logic 240 implemented on the gateway device 810 may be transparent to the bandwidth virtualization server logic 242 implemented on the gateway device 810. The bandwidth virtualization logic 240 may view the bandwidth virtualization proxy logic 812 as an application executing on the gateway device 810 that sends bandwidth requests, without any regard to the bandwidth virtualization server logic 242. In one implementation, the final bandwidth allocation negotiated between the bandwidth virtualization client logic 240 and the server 720 may be different from the accepted bandwidth allocation negotiated between the bandwidth virtualization server logic 242 and the client. Alternatively, the bandwidth virtualization proxy logic 812 may negotiate bandwidth allocations such that the final bandwidth allocation negotiated between the bandwidth virtualization client logic 240 and the server 720 is the same as the accepted bandwidth allocation negotiated between the bandwidth virtualization server logic 242 and the client.

Figure 9:
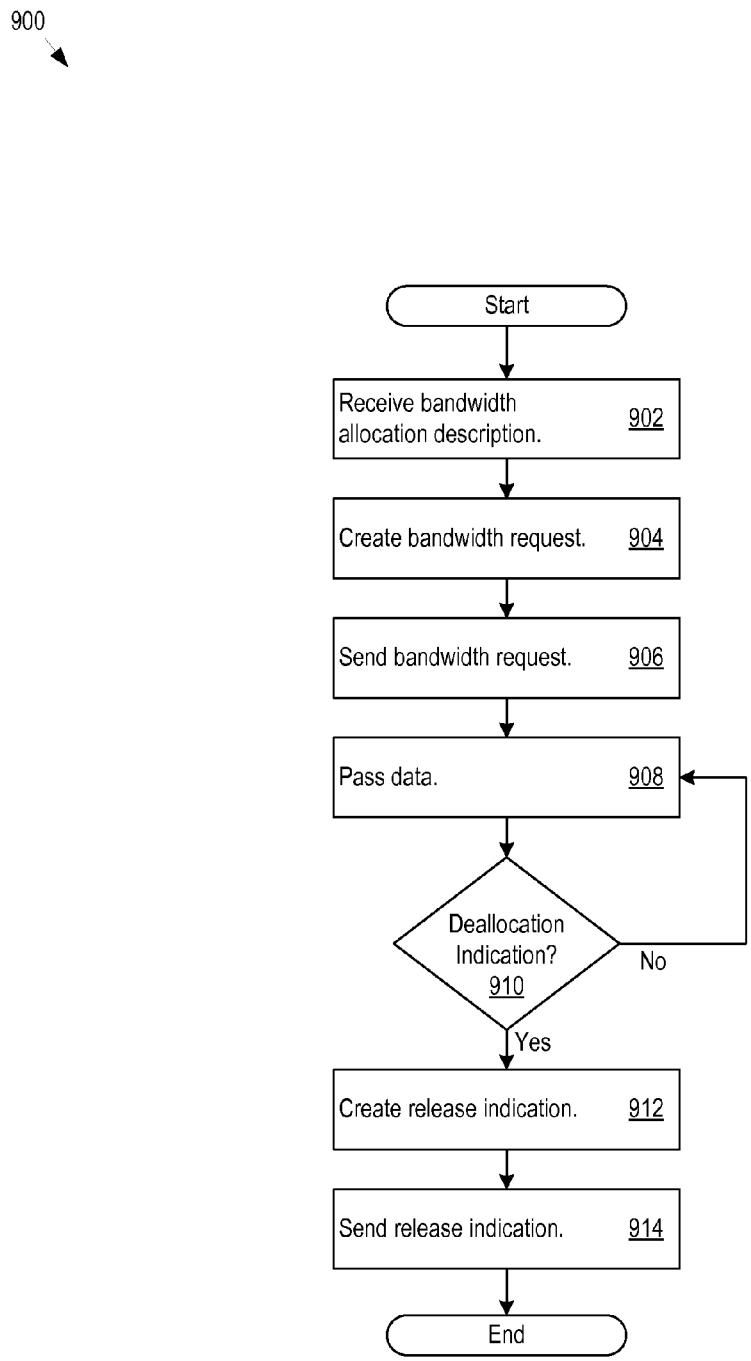
FIG. 9 shows an example of logic that a device may implement as hardware, software, or both.

FIG. 9 shows an example of logic 900 that a device 100 may implement as hardware, software, or both. For example, the device 100 may implement the logic 900 as part of the bandwidth virtualization logic 114 or as the bandwidth virtualization proxy logic 812. The bandwidth virtualization proxy logic 812 may receive a bandwidth allocation description (902) that describes a bandwidth allocation for communication between a client device and bandwidth virtualization server logic 242 implemented on the device 100.

The bandwidth virtualization proxy logic 812 may create a bandwidth request (904) based on the received bandwidth allocation description. For example, the bandwidth virtualization proxy logic 812 may extract the upstream and downstream bandwidth amounts from the received bandwidth allocation description to create the bandwidth request. The bandwidth virtualization proxy logic 812 may also format the bandwidth request to mimic an application bandwidth request that bandwidth virtualization client logic 240 may recognize. The bandwidth virtualization proxy logic 812 may then send the created bandwidth request to bandwidth virtualization client logic 240 implemented on the device 100.

The bandwidth virtualization server logic 242 implemented on the device 100 may communicate with a client device, e.g., the client devices 220-222, across a determined bandwidth allocation. In a similar fashion, the bandwidth virtualization client logic 240 implemented on the device 100 may communicate with a device, e.g., the server 720, across a determined bandwidth allocation. In one implementation, the bandwidth virtualization proxy logic 812 may pass data between the bandwidth virtualization server logic 242 and the bandwidth virtualization client logic 240 (908). For example, the bandwidth virtualization proxy logic 812 may pass data received by the bandwidth virtualization server logic 242 (e.g., application data from an application executing on the client device 220) to the bandwidth virtualization client logic 240 to send to the server 720. Similarly, the bandwidth virtualization proxy logic 812 may pass data received by bandwidth virtualization client logic 240 to the bandwidth virtualization server logic 242 to send to the client device 220.

The bandwidth virtualization proxy logic 812 may continue to pass data until a deallocation indication is received from the bandwidth virtualization server logic 242 (910), which the bandwidth virtualization server logic 242 may have received from the client device 220. The bandwidth virtualization proxy logic 812 may create a release indication based on the received deallocation indication (912). For example, the deallocation indication may correlate to a bandwidth allocation from which the bandwidth virtualization proxy logic 812 previously created a bandwidth request for. The bandwidth virtualization server logic 242 may create a release indication for the bandwidth allocation corresponding to the previously created bandwidth request.

The bandwidth virtualization proxy logic 812 may then send the created release indication to the bandwidth virtualization client logic 242 (914). To the bandwidth virtualization client logic 240 implemented on the device, the created release indication may appear to be a release The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
   communicating, by a device, across multiple communication networks including a first communication network and a second communication network that is of a different protocol from the first communication network;
   aggregating bandwidth of the first communication network and bandwidth of the second communication network into an aggregated virtualized bandwidth;
   receiving, by client logic executed on the device, a plurality of bandwidth requests from a plurality of respective applications, each of the bandwidth requests indicative of respective quality of service requirements and a respective requested amount of bandwidth;
   determining, for each of the plurality of applications, a respective different bandwidth allocation of a portion of the aggregated virtualized bandwidth in accordance with the respective quality of service requirements and the respective requested amount of bandwidth indicated by the bandwidth requests;
   sending, by the client logic, to one of a gateway device or a server device, the determined respective bandwidth allocations, wherein the one of the gateway device or the server device communicate over the first communication network and the second communication network;
   receiving, for each of the sent determined respective bandwidth allocations, one of an acceptance reply, a rejection reply or an alternative bandwidth allocation from the one of the gateway device or the server device;
   modifying, by the client logic, each of the respective different bandwidth allocations for which the respective rejection reply is received and sending a modified respective bandwidth allocation to one of the gateway device or the server device; and
   communicating application data from each of the plurality of applications according to the determined respective bandwidth allocations due to receipt of a respective acceptance reply, or according to a respective received alternative bandwidth allocation due to receipt of a respective alternative bandwidth allocation, the application data communicated through the first communication network and the second communication network.

2. The method of claim 1 further comprising:
   the client logic determining an allocation of a respective communication resource comprising at least a portion of one or more communication interfaces included in the device to each of the respective different bandwidth allocations; and
   where communicating comprises communicating application data from the first and second applications through the first communication network and the second communication network using the allocation of the respective communication resource allocation for each of the respective different bandwidth allocations.

3. The method of claim 2 where communicating comprises communicating the application data using a first communication interface and a second communication interface when the allocation of the respective communication resource includes both the first and the second communication interfaces.

4. The method of claim 1, where determining, for each of the plurality of applications, a respective different bandwidth allocation comprises determining an upstream bandwidth allocation and a downstream bandwidth allocation for each respective bandwidth allocation.

5. The method of claim 1, further comprising:
   receiving a bandwidth release indication from one of the applications; and
   deallocating a bandwidth allocation of the one of the applications.

6. The method of claim 5, further comprising:
   creating a deallocation indication for the bandwidth allocation that was deallocated; and
   sending the deallocation indication to the gateway device or the server device.

7. The method of claim 5, further comprising:
   considering deallocated bandwidth in future bandwidth allocation determinations.

8. A system comprising:
   a first communication interface for communication across a first network;
   a second communication interface for communication across a second network of a different network protocol from the first network;
   a processor; and
   a memory comprising bandwidth virtualization client instructions that, when executed by the processor, are operable to:
   aggregate bandwidth of the first communication interface and bandwidth of the second communication interface into an aggregated virtualized bandwidth;
   determine a bandwidth allocation for each of a plurality of applications executed by one of the processor or another device in communication with the processor, the bandwidth allocation determined based on bandwidth requests generated by each of the respective applications, the bandwidth allocations being determined in accordance with respective requested bandwidth and quality of service requirements and being less than an entirety of the aggregated virtualized bandwidth;
   negotiate, with one of a gateway device or a bandwidth virtualization server device, a confirmed respective bandwidth allocation for each of the plurality of applications, wherein negotiation of each of the confirmed respective bandwidth allocations with one of the gateway device or the bandwidth virtualization server comprises:
creation of a different respective bandwidth allocation description that specifies the respective requested bandwidth for each of the respective bandwidth allocations;
transmission of each of the respective bandwidth allocation descriptions to the gateway device or the bandwidth virtualization server;
receipt, for each of the sent bandwidth allocation descriptions, of one of an acceptance reply, a rejection reply or an alternative bandwidth allocation from the one of the gateway device or the bandwidth virtualization server device;
modification of each of the different respective bandwidth allocation descriptions for which the respective rejection reply is received, and transmission of modified respective bandwidth allocation descriptions to one of the gateway device or the bandwidth virtualization server device;
receipt of a confirmation that the gateway device or the bandwidth virtualization server accepts each of the respective bandwidth allocations or the modified respective bandwidth allocations as the confirmed bandwidth allocations; and
communicate application data of the respective applications through the confirmed bandwidth allocations, the confirmed bandwidth allocation being either the respective bandwidth allocation or modified respective bandwidth allocation for which an acceptance reply is received or an alternative bandwidth allocation received.

9. The system of claim 8, where the aggregated virtualized bandwidth comprises a total bandwidth and an available bandwidth.

10. The system of claim 8, where the bandwidth virtualization client instructions are executed to determine the bandwidth allocation for the plurality of applications by:
obtaining an available bandwidth of the aggregated virtualized bandwidth; and
when the available bandwidth is greater than the respective bandwidth requests of the plurality of applications:
allocating a portion of the aggregated virtualized bandwidth based on each of the respective bandwidth requests.

11. The method of claim 1, wherein receiving, for each of the sent bandwidth allocations, one of the acceptance reply, the rejection reply or the alternative bandwidth allocation comprises after receipt of at least one of the acceptance reply or the alternative bandwidth allocation allocating communication resources to the at least one of an accepted bandwidth allocation or an alternative bandwidth allocation, the communication resources comprising a plurality of communication interfaces included in the device.

12. The method of claim 11, wherein communicating application data comprises the device communicating application data from the plurality of applications via the allocated communication resources according to the accepted bandwidth allocation or the alternative bandwidth allocation through the first communication network and second communication network.

13. The method of claim 1, wherein the device is another gateway device, and wherein receiving, by the client logic executing on the device, the plurality of bandwidth requests from the plurality of respective applications comprises: the another gateway device receiving over a local area network a first bandwidth request from a first device upon which a first application is being executed, the another gateway device receiving over the local area network a second bandwidth request from a second device upon which a second application is being executed, creating a bandwidth allocation description for each of the first bandwidth request and the second bandwidth request; the another gateway device sending each bandwidth allocation description over the first or the second communication network to the bandwidth virtualization server device or a gateway device; and the another gateway device receiving confirmation from the server device that the bandwidth allocations are accepted by the server device.

14. The method of claim 13, further comprising upon receiving confirmation from the server that the bandwidth allocations are accepted, the another gateway device determining a communication resource allocation for each of the bandwidth allocations, the communication resource allocation comprising allocation of at least a portion of communication interfaces included in the another gateway device.

15. The method of claim 1, further comprising the client logic receiving a bandwidth release indication from one of the plurality of applications, and deallocating the respective bandwidth allocation for the one of the plurality of applications by updating the aggregated virtualized bandwidth to reflect availability of the respective portion of the aggregated virtualized bandwidth determined for the one of the plurality of applications.

* * * * *

UNITED STATES PATENT AND TRADEMARK OFFICE
CERTIFICATE OF CORRECTION

PATENT NO. : 9,379,996 B2
APPLICATION NO. : 13/535568
DATED : June 28, 2016
INVENTOR(S) : Gordon Yong Li Page 1 of 1

It is certified that error appears in the above-identified patent and that said Letters Patent is hereby corrected as shown below:

In the Claims:

Column 15, line 27, delete "allocations" and insert --allocation--.

Column 15, line 31, insert --is-- between "allocation" and "received".

Signed and Sealed this
Twenty-third Day of August, 2016

Michelle K. Lee
*Director of the United States Patent and Trademark Office*